United States Patent [19]

Dourbal

[11] Patent Number: 5,717,656
[45] Date of Patent: Feb. 10, 1998

[54] METHOD AND APPARATUS FOR DETECTING AND LOCATING A CONCEALED LISTENING DEVICE

[75] Inventor: Pavel F. Dourbal, Feasterville, Pa.

[73] Assignee: YBM Technologies, Inc., Newtown, Pa.

[21] Appl. No.: 700,203

[22] Filed: Aug. 20, 1996

[51] Int. Cl.$^6$ .................... H04B 7/14; H04B 11/00; H04B 17/00
[52] U.S. Cl. .......................... 367/128; 455/67.2
[58] Field of Search ...................... 367/128, 127, 367/2; 456/67.2, 67.7, 228, 227

[56] References Cited

U.S. PATENT DOCUMENTS

| | | | |
|---|---|---|---|
| 684,706 | 10/1901 | Mundy | 367/128 |
| 3,076,519 | 2/1963 | Alsabrook | 367/2 |
| 3,528,053 | 9/1970 | Rubin | 367/108 |
| 3,566,348 | 2/1971 | Leyden et al. | 367/128 |
| 3,745,517 | 7/1973 | Sochard | 367/107 |
| 3,939,420 | 2/1976 | Risberg et al. | 455/67.2 |
| 4,055,830 | 10/1977 | Wilson et al. | 367/128 |
| 4,127,817 | 11/1978 | Bell, Jr. | 455/67.2 |
| 4,264,978 | 4/1981 | Whidden | 367/128 |
| 4,313,183 | 1/1982 | Saylors | 367/128 |
| 4,368,539 | 1/1983 | Whidden | 455/227 |
| 4,399,556 | 8/1983 | Whidden | 367/128 |
| 4,805,231 | 2/1989 | Whidden | 342/20 |

FOREIGN PATENT DOCUMENTS

| | | |
|---|---|---|
| 24 28 299 | 2/1976 | Germany. |
| 94025549/09 | 8/1995 | Russian Federation. |
| 21 70 907 | 8/1986 | United Kingdom. |

*Primary Examiner*—Daniel T. Pihulic
*Attorney, Agent, or Firm*—Caesar, Rivise, Bernstein, Cohen & Pokotilow, Ltd.

[57] ABSTRACT

A method and system for detecting the presence, and the location of, a concealed listening device. In the method, the acoustic signal from the actual acoustic source and electromagnetic signals in the radio frequency band (containing the electromagnetically-transmitted version of the acoustic signal on an unknown frequency) are obtained and an average cross correlation of the auto correlation of each of these two signal types is derived for determining whether a concealed listening device is even present and, if so, the frequency of the electromagnetically-transmitted version. The method then utilizes timed pulse responses of a plurality of acoustic transducers, as well as a distinguishing function, to determine the location of the concealed listening device. In the system, a controller controls the operation of a radio receiver, a microphone and an arrangement of acoustic transducers in accordance with the method described above.

36 Claims, 13 Drawing Sheets

$$\rho(\omega) = \frac{1}{N} \sum_{k=1}^{N} \frac{V_{sound}^2}{R_{max}^2} \int_{\tau=0}^{\frac{R_{max}}{V_{sound}}} r_x(\tau,k) \cdot r_y(\tau,k) \, d\tau$$

WHERE:

$V_{sound}$ = SPEED OF SOUND PROPAGATING THROUGH THE AIR;

$R_{max}$ = MAXIMUM RANGE IN THE ROOM;

N = NUMBER OF ELEMENTARY SIGNAL TESTS PROCESSED INDEPENDENTLY FROM EACH OTHER IN ORDER TO PROVIDE THE TOTAL TEST TIME FOR EACH FREQUENCY;

$\omega \in [\Omega_{min}, \Omega_{max}]$;

$r_x(\tau,k)$ IS THE AUTO CORRELATION FUNCTION FOR $x(t)$ $r_y(\tau,k)$ IS THE AUTO CORRELATION FUNCTION FOR $y(t)$

*FIG. 9*

$$r_x(T,k) = \frac{\displaystyle\int_{t=\frac{T}{2}+(k-1)\cdot\frac{R_{max}}{V_{sound}}}^{k\cdot\frac{R_{max}}{V_{sound}}-\frac{T}{2}} X_\omega\left(t-\frac{T}{2}\right)\cdot X_\omega\left(t+\frac{T}{2}\right)dt}{\displaystyle\int_{t=\frac{T}{2}+(k-1)\cdot\frac{R_{max}}{V_{sound}}}^{k\cdot\frac{R_{max}}{V_{sound}}-\frac{T}{2}} X_\omega^2(t)\,dt}, \text{ FOR } X(t)$$

FIG. 10

$$r_y(T,k) = \frac{\displaystyle\int_{t=\frac{T}{2}+(k-1)\cdot\frac{R_{max}}{V_{sound}}}^{k\cdot\frac{R_{max}}{V_{sound}}-\frac{T}{2}} y\left(t-\frac{T}{2}\right)\cdot y\left(t+\frac{T}{2}\right)dt}{\displaystyle\int_{t=\frac{T}{2}+(k-1)\cdot\frac{R_{max}}{V_{sound}}}^{k\cdot\frac{R_{max}}{V_{sound}}-\frac{T}{2}} y^2(t)\,dt}, \text{ FOR } y(t)$$

FIG. 11

$$\rho_{\text{new average}}(\omega) = \frac{\rho_{\text{instant}}(\omega)}{k+1} + \frac{k}{k+1} \cdot \rho_{\text{old average}}(\omega)$$

FIG. 12

$$\text{AVERAGE} = \frac{\text{ENTERED\_SIGNAL}}{k} + \frac{(k-1)}{k} \cdot \text{AVERAGE}$$

WHERE DIVERGE/$dk \neq 0$ (CONDITION OF STABILIZATION OF THE SUM)

FIG. 13

$$\lambda(\psi) = \frac{1}{\left(\text{Min}(\psi, \frac{R_{\max}}{V_{\text{sound}}} - \psi)\right)^2} \int_{\tau=0}^{\text{Min}(\psi, \frac{R_{\max}}{V_{\text{sound}}} - \psi)} C_-(\psi, \tau, k) \cdot C_+(\psi, \tau, k) \cdot d\tau$$

FIG. 14

$$C_-(\psi, T) = \frac{\displaystyle\int_{t=\frac{T}{2}}^{\psi-\frac{T}{2}} X_\omega\left(t-\frac{T}{2}\right) \cdot X_\omega\left(t+\frac{T}{2}\right) \cdot dt}{\displaystyle\int_{t=\frac{T}{2}}^{\psi-\frac{T}{2}} X_\omega^2(t) \cdot dt}$$

FIG. 15

$$C_+(\psi,\tau) = \frac{\int_{t=\psi+\frac{T}{2}}^{\frac{R_{max}}{V_{sound}}-\frac{T}{2}} X_\omega\left(t-\frac{T}{2}\right) \cdot X_\omega\left(t+\frac{T}{2}\right) \cdot dt}{\int_{t=\psi+\frac{T}{2}}^{\frac{R_{max}}{V_{sound}}-\frac{T}{2}} X_\omega^2(t) \cdot dt}$$

*FIG. 16*

$$R_i = \sqrt{(x-x_i)^2 + (y-y_i)^2 + (z-z_i)^2} \quad \text{for } i=1,2,3,4$$

WHERE $x, y, z$ REPRESENT THE CARTESIAN COORDINATES OF THE CONCEALED BUG

*FIG. 17*

$$\Delta^2 \leq \left(R_i - \sqrt{(x-x_i)^2 + (y-y_i)^2 + (z-z_i)^2}\right) \text{ WHERE}$$

$\Delta$ IS THE LINEAR MEASUREMENT DEVIATION AND CAN BE APPROXIMATELY 10cm FOR ACOUSTIC SIGNAL MEASUREMENTS

*FIG. 18*

$$x = \frac{1}{2}\left(g + \frac{(R_4+R_1) \cdot (R_4-R_1)}{g}\right)$$

*FIG. 19*

$$y = \frac{1}{2}\left(g + \frac{(R_4 + R_2) \cdot (R_4 - R_2)}{g}\right)$$

FIG. 20

$$z = \frac{1}{2}\left(g + \frac{(R_4 + R_3) \cdot (R_4 - R_3)}{g}\right)$$

FIG. 21

$$\Delta^2 \leq \Delta_1^2 = \left(R_1 - \sqrt{(x-g)^2 + y^2 + z^2}\right)^2$$

FIG. 22

$$\Delta^2 \leq \Delta_2^2 = \left(R_2 - \sqrt{x^2 + (y-g)^2 + z^2}\right)^2$$

FIG. 23

$$\Delta^2 \leq \Delta_3^2 = \left(R_3 - \sqrt{x^2 + y^2 \; (z-g)^2}\right)^2$$

FIG. 24

$$\Delta^2 \leq \Delta_4^2 = \left(R_4 - \sqrt{x^2 + y^2 + z^2}\right)^2$$

FIG. 25

$$S = \Delta_1^2 + \Delta_2^2 + \Delta_3^2 + \Delta_4^2 \xrightarrow[(x,y,z)]{} \min$$

FIG. 26

$$x_{next} = x + \frac{\partial s}{dx}, \quad y_{next} = y + \frac{\partial s}{dy}, \quad z_{next} = z + \frac{\partial s}{dz}$$

$$\text{WHERE} \quad \left|\frac{\partial s}{dx}\right| + \left|\frac{\partial s}{dy}\right| + \left|\frac{\partial s}{dz}\right| > \emptyset$$

FIG. 27

METHOD AND APPARATUS FOR DETECTING AND LOCATING A CONCEALED LISTENING DEVICE

FIELD OF THE INVENTION

The invention pertains to range measuring systems and, more particularly, to methods and apparatus for searching for and locating a transceiver transmitting an acoustic signal through the air, through an electrical network, or through the air through an electrical network; an acoustic signal from an adjacent room; a signal from a telephone line into the air; or a signal from a telephone line into an electrical network.

Various types of range measuring systems are known or in use:

In U.S. Pat. No. 684,706 (Mundy), there is disclosed a signaling system using a wireless signal and a sound signal.

In U.S. Pat. No. 3,076,519 (Alsabrook), there is disclosed an ultrasonic surveyor's distance measuring instrument.

In U.S. Pat. No. 3,528,053 (Rubin), there is disclosed an apparatus for a depth indicator.

In U.S. Pat. No. 3,556,348 (Leyden et al.) there is disclosed a range measuring system in which the range is determined by calculations based on the difference in arrival times at the measurement point of two signals propagating at different and known rates. The system measures the difference between the arrival times of an electromagnetic signal and an acoustic signal at the measurement point and converts this time information into distance information. However, in this range measurement system, reliable information can be obtained only for objects having a position known a priori, and the system cannot automatically detect a hidden transceiver, such as a so-called "bug" device for listening to conversations in rooms.

In U.S. Pat. No. 3,939,420 (Risberg et al.), there is disclosed a method and apparatus for detecting the presence of a surreptitiously placed radio transmitter or bug.

In U.S. Pat. No. 3,745,517 (Sochard), there is disclosed a distance measuring system that uses a source of acoustic signals of at least a predetermined wavelength which is transmitted to a reference surface and the reflected acoustic signal is received in a detector.

In U.S. Pat. No. 4,055,830 (Wilson et al.), there is disclosed a distance measuring system that utilizes sound waves.

In U.S. Pat. No. 4,313,183 (Saylors), there is disclosed an acoustic distance measuring method and apparatus which uses a predetermined frequency shift keyed bit pattern as the acoustic signal transmitted and received.

In British Patent No. 2,170,907, there is disclosed a range measuring system that utilizes a radio frequency signal which is transmitted and received by a remote receiving unit which in turn then transmits a sonic or ultrasonic signal back to the transmitter. This return signal is analyzed for calculating the time lapse between the transmission of the original radio signal and the receipt of the return sound signal, as well as for calculating the distance between the transmitter and the receiver.

In German patent application no. 24 28 299 (Wächtler), there is disclosed a system for detecting eavesdropping transmitters using a cross correlation between the noise immediately recorded from a meeting room with the demodulated low frequency signal which is delivered from a tunable receiver such that when a correlation exists, the presence of an eavesdropping transmitter can be inferred. In particular, Wächtler uses the cross correlation between, e.g., the acoustic signal and the eavesdropping transmitter's version of the acoustic signal. Such use requires the use of a phase shifter to eliminate any phase ambiguity. In contradistinction, as will be described in detail later, the present invention does not use that same cross correlation; instead, the present invention utilizes the cross correlation of the auto correlation of the acoustic signal and the auto correlation of electromagnetic signals detected in the radio frequency band. As such, the present invention can detect the presence/absence of a concealed listening device despite the fact that the acoustic source(s) can be scattered, mixed, reflected and non-linearly attenuated. Thus, for example, where reflecting occurs, the acoustic signal consists of an unlimited number of acoustic signals, the present invention can still detect the presence/absence of a concealed listening device, as well as its location.

OBJECTS OF THE INVENTION

Accordingly, it is the general object of the instant invention to provide a method and apparatus for range measuring which improves upon the existing range measuring methods and apparatus.

It is a further object of the present invention is to provide a method and apparatus to detect the presence or absence of a concealed listening device.

It is yet a further object of the present invention to provide a method and apparatus to determine the location of a concealed listening device.

It is yet another object of the present invention to simplify the method of detecting a transceiver and to simplify the apparatus for detecting a concealed listening device.

It is still further an object of the present invention to use the cross correlation function based on the auto correlation function of two signals to detect the presence of a concealed listening device.

It is even yet a further object of the present invention to utilize a distinguishing function to determine the beginning of a received signal whereby the distinguishing function is based on the auto correlation of the parts of the received signal.

It is still yet a further object of the present invention to eliminate any phase ambiguity that arises when a cross correlation signal is used alone between an acoustic signal and a concealed listening device's version of the acoustic signal.

It is even yet another object of the present invention for comparing real signals that can have spread acoustic sources, be mixed or reflected and which may be attenuated non-linearly while detecting the presence/absence of a concealed listening device and its location.

SUMMARY OF THE INVENTION

These and other objects of the instant invention are achieved by providing an apparatus for detecting the presence or absence of a concealed listening device wherein the concealed listening device receives an acoustic signal and then wirelessly transmits an electromagnetic version of that acoustic signal over the air to a remote receiver. The apparatus comprises a radio receiver for measuring the signal strength of a first electrical signal in the radio frequency band to which the radio receiver is tuned. The apparatus includes a microphone for detecting and converting the acoustic signal into a second electrical signal. The apparatus also comprises a controller, coupled to the radio receiver and the microphone, for tuning the radio receiver within the radio frequency band. The controller comprises means for determining the cross correlation between an auto correlation of the first electrical signal and an auto correlation of the second electrical signal to determine the presence of the concealed listening device.

DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT OF THE INVENTION

Figure 1:
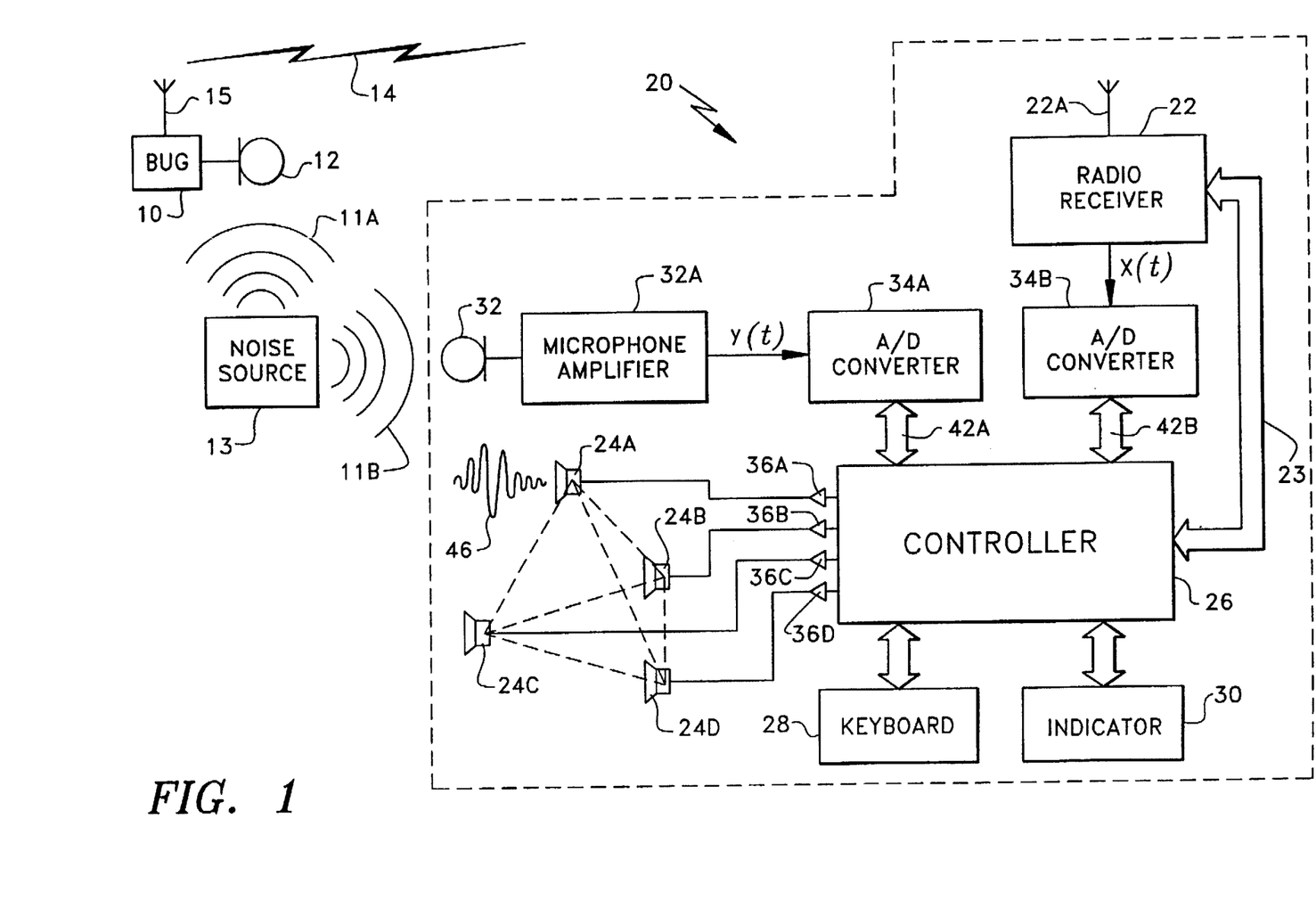
FIG. 1 is a block diagram of the present invention.

Referring now in greater detail to the various figures of the drawing wherein like reference characters refer to like parts, an apparatus for detecting and locating a concealed listening device in accordance with the present invention is shown generally at 20 in FIG. 1.

Typically, a bug 10 is hidden in some location within a confined area such as room. The concealed bug 10 listens for an acoustic signal 11A, via an associated bug microphone 12, from some noise source 13 (e.g., a human voice, noise, etc.). An internal bug transmitter (not shown) then transmits an electromagnetic signal 14 in the radio frequency band to a remote receiver (not shown) via an antenna 15, thereby permitting covert listening by someone located at a remote receiver (also not shown) tuned to the appropriate frequency.

According to the proposed system 20 and method (FIG. 1), the detection of the location of the hidden bug 10 comprises a two-step process: (1) scanning, detecting and then maintaining a radio receiver 22 on the frequency of the electromagnetic signal 14 and then (2) using pulsed acoustic transducers 24A–24D to obtain the location of the bug 10.

The system 20 of the present invention comprises a radio receiver 22 having an antenna 22A, pulsed acoustic transducers 24A–24D, a controller 26, a keyboard 28, an indicator 30 (e.g., a computer monitor or display), a microphone 32 including a microphone amplifier 32A, analog-to-digital converters 34A and 34B (hereinafter "A/Ds") and acoustic transducer power amplifiers 36A–36D. The controller 26 controls the radio receiver 22 (e.g., AOR AR-3000A Communication Receiver) operation via a communication link 23 (e.g., RS-232 bi-directional link). The controller 26 may reside in a Texas Instrument Travel Mate Notebook computer having a sound card (e.g., part of the TI Travel Mate Notebook Computer, or Sound Blaster 16 manufactured by Creative Labs) using a Pentium Processor. The keyboard 28 (e.g., part of the TI Travel Mate Notebook computer) provides a user interface for the operator to communicate with the system 20. The indicator 30 provides, among other things, displays for bug presence, bug location, etc. The microphone amplifier 32A and the A/Ds 34A and 34B may all reside on the sound card.

One exemplary configuration of the system 20 includes the radio receiver 22 being coupled to the serial port (COM1) of the controller 26, the acoustic transducers 24A–24D coupled to the printer port of the controller 26, the A/D 34A coupled to the bus connection of the controller 26 and the A/D 34B coupled to the bus connection of the controller 26.

When the noise source 13 emits the sound 11A that is detected by the bug microphone 12 (if a bug device 10 is even present), a similar sound 11B is detected by the microphone 32. These sounds are similar except for a phase difference due to the location of the two microphones. The acoustic signal 11A is amplified by an internal bug amplifier (not shown) and is then modulated and transmitted, via the bug antenna 15, as the electromagnetic signal 14 on some unknown radio frequency. After scanning the full frequency range $\Omega_{min}$–$\Omega_{max}$ of the radio receiver 22 and tuning to the appropriate frequency (as will be discussed later), the antenna 22A will also receive the electromagnetic signal 14.

Once the sound signal 11B and the electromagnetic signal 14 are received by the system 20, the sound signal 11B is amplified via the microphone amplifier 32A into a first analog signal, y(t). The received electromagnetic signal 14 is demodulated in the radio receiver 22 and this demodulated signal forms a second analog signal, x(t). Both of these analog signals are converted into digital signals 42A and 42B via respective A/Ds 34A and 34B. The digital signals 42A and 42B form two input signals to the controller 26.

To detect if a concealed bug 10 is in the room, the controller 26 utilizes statistical dependence analysis on the two received signals, namely, x(t) and y(t), while scanning the frequency band of the receiver 22. Hence, the controller 26 implements two processes that operate in a parallel: a first scanning process (FIGS. 2A–2B) and a second detecting process (FIGS. 3A–3B). Basically, these processes cooperate to determine (1) whether a bug 10 is even present and, if so, (2) at what frequency the bug 10 transmitter is transmitting.

Figure 9:
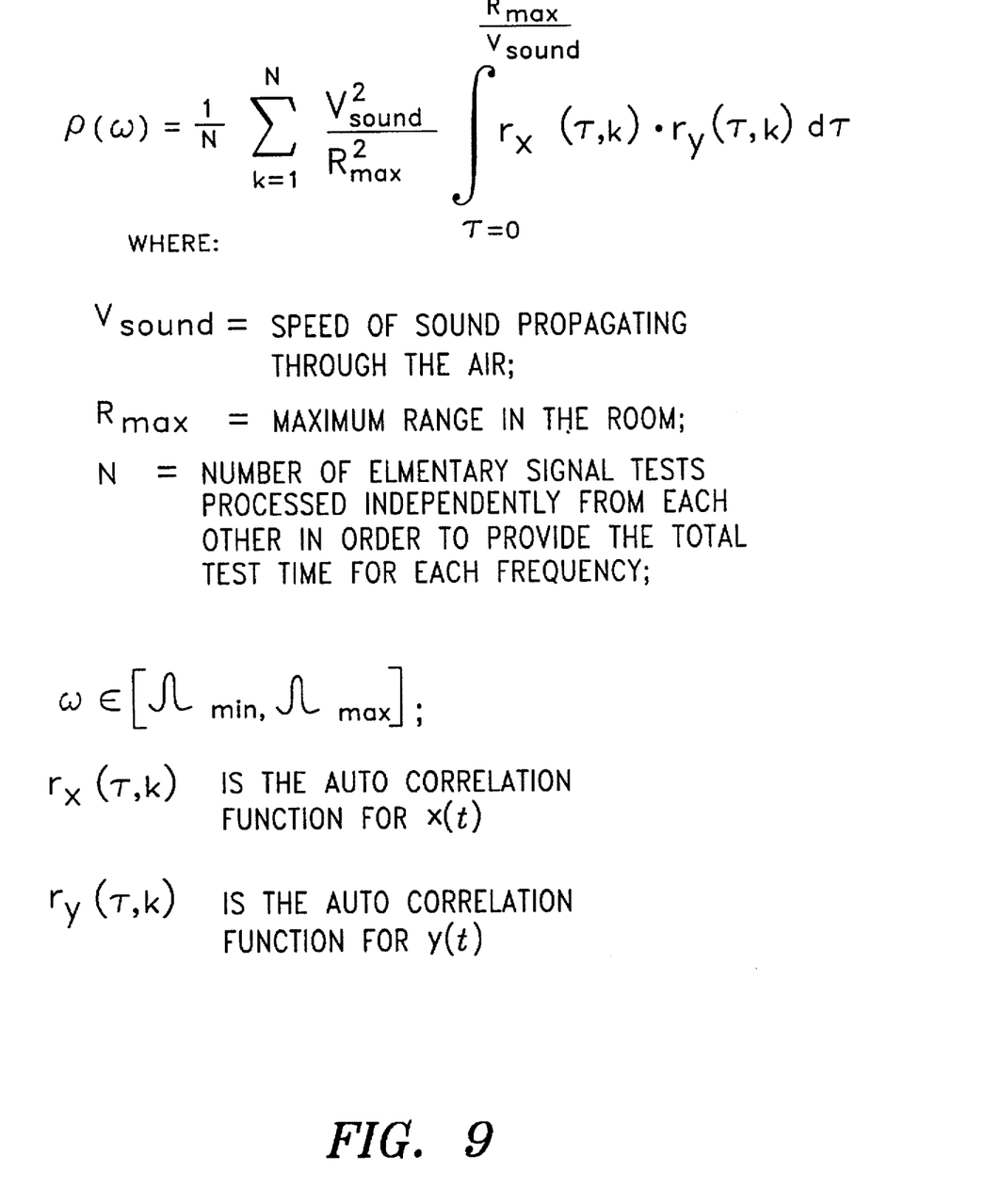
FIG. 9 is an equation of the cross correlation function of the auto correlation functions of the acoustic signal y(t) and an electromagnetic signal x(t)
Figure 10:
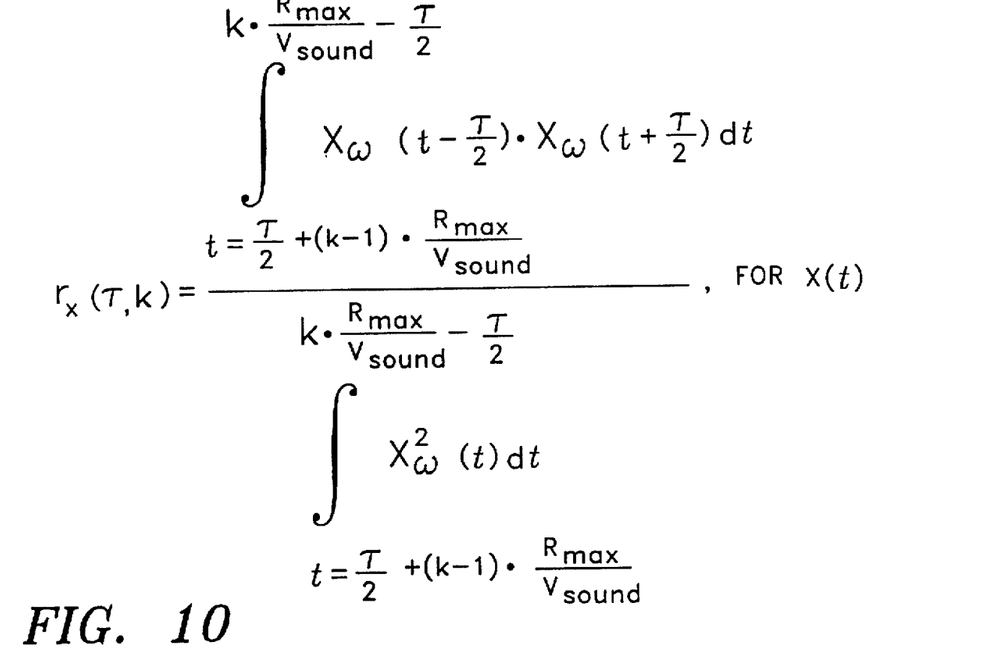
FIG. 10 is the auto correlation function of the electromagnetic signal x(t)
Figure 11:
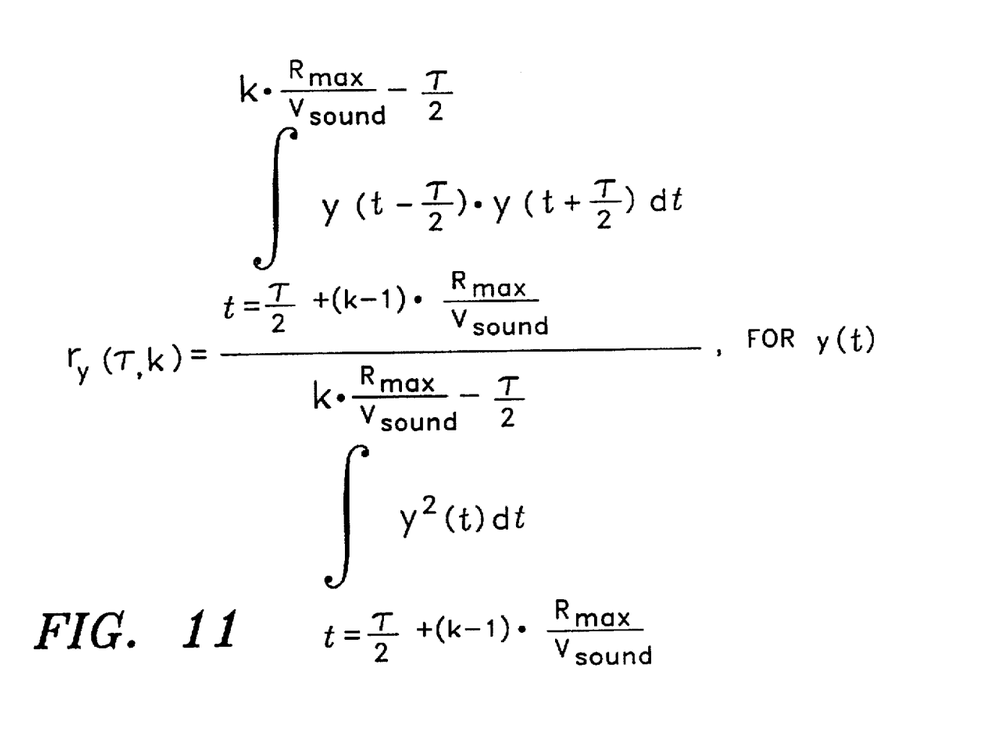
FIG. 11 is the auto correlation function of the acoustic signal.
Figure 12:
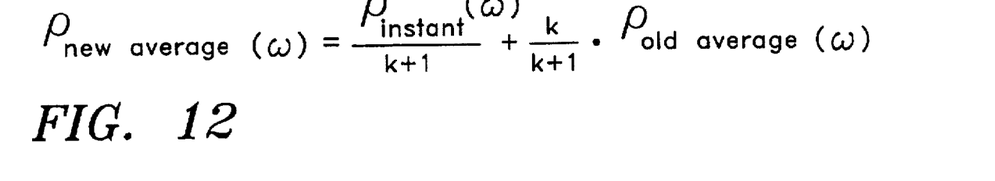
FIG. 12 is the average cross correlation function.

The statistical dependence analysis involves the use of a cross correlation $\rho(\omega)$, between the auto correlation functions $r_x(\tau,k)$ and $r_y(\tau,k)$ for x(t) and y(t), respectively. The cross correlation $\rho(\omega)$ is defined in FIG. 9 and the auto correlation functions, $r_x(\tau,k)$ and $r_y(\tau,k)$, are set forth in FIGS. 10 and 11, respectively. An average value $\rho_{new\ average}(\omega)$, defined in FIG. 12, of the cross correlation is determined for a number of k values at a particular frequency, f, where $f=\omega/2\pi$. Once this average cross correlation is determined, it is compared to a threshold value, P, (e.g., 0.7). If the average cross correlation value is greater than the threshold level P, a bug 10 is determined to be present; if, on the other hand, the average cross correlation value is less than the threshold level P, a new frequency in the receiver frequency band is selected and the analysis repeated.

The threshold level, P, is initialized by having the apparatus 20 power up in a location where there is absolute certainty of no concealed listening device. The apparatus 20 is then allowed to operate in a "Learn mode" whereby it carries out the two parallel processes (i.e., the scanning and detecting processes) and calculates an average cross correlation value at the end of the Learn mode. This value then represents the threshold value P. As is well-known in random signal analysis, the value of the cross-correlation is between 0 and 1, whereby 0 indicates no correlation between the signals and 1 indicates absolute dependence between the signals. Once the P value is determined, the apparatus 20 no longer needs to determine the P value when operating in the "Normal Operating mode".

Figures 2, 2A:
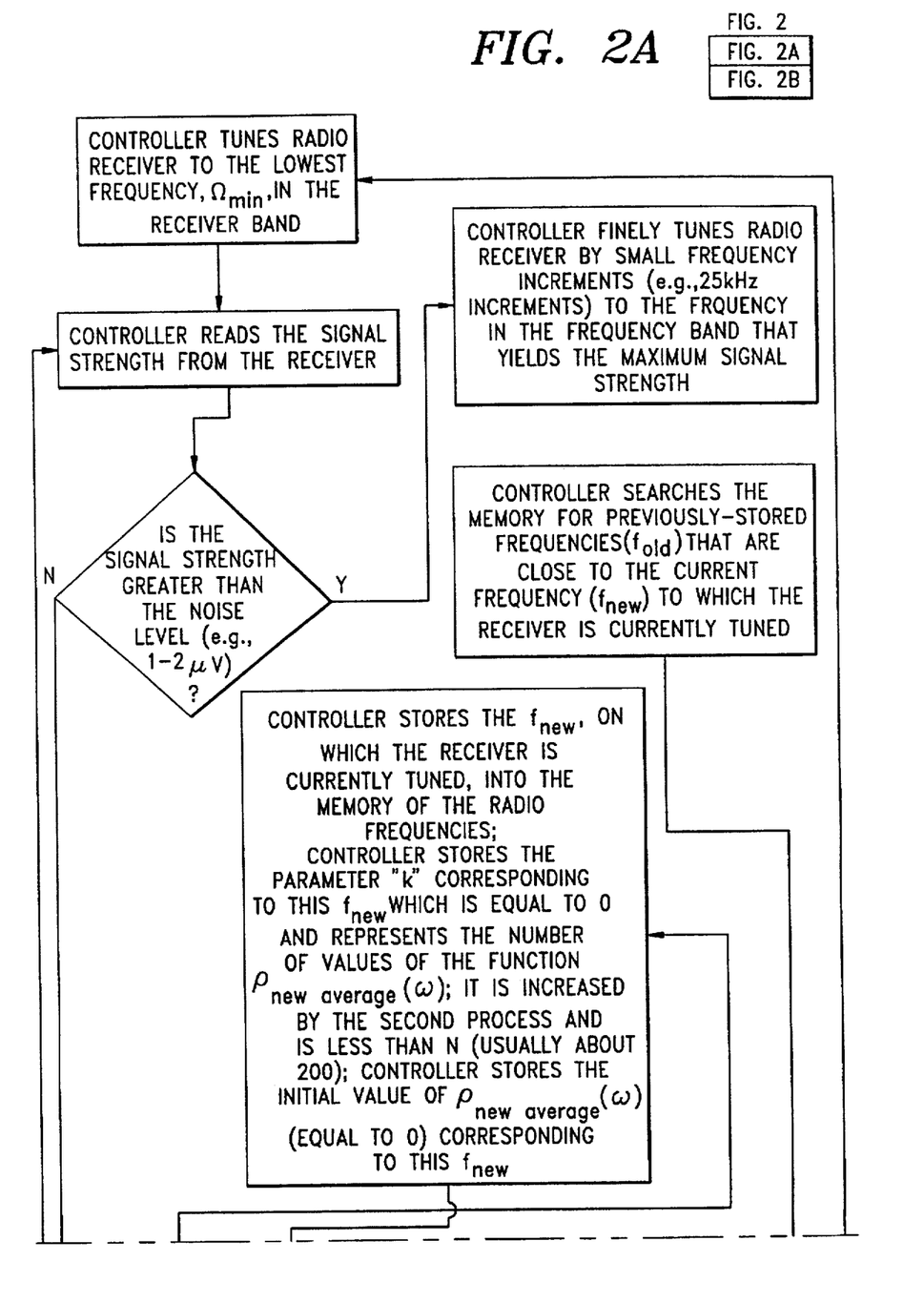
FIGS. 2A–2B comprise a flow chart of the scanning (first) process of the present invention.
Figure 2B:
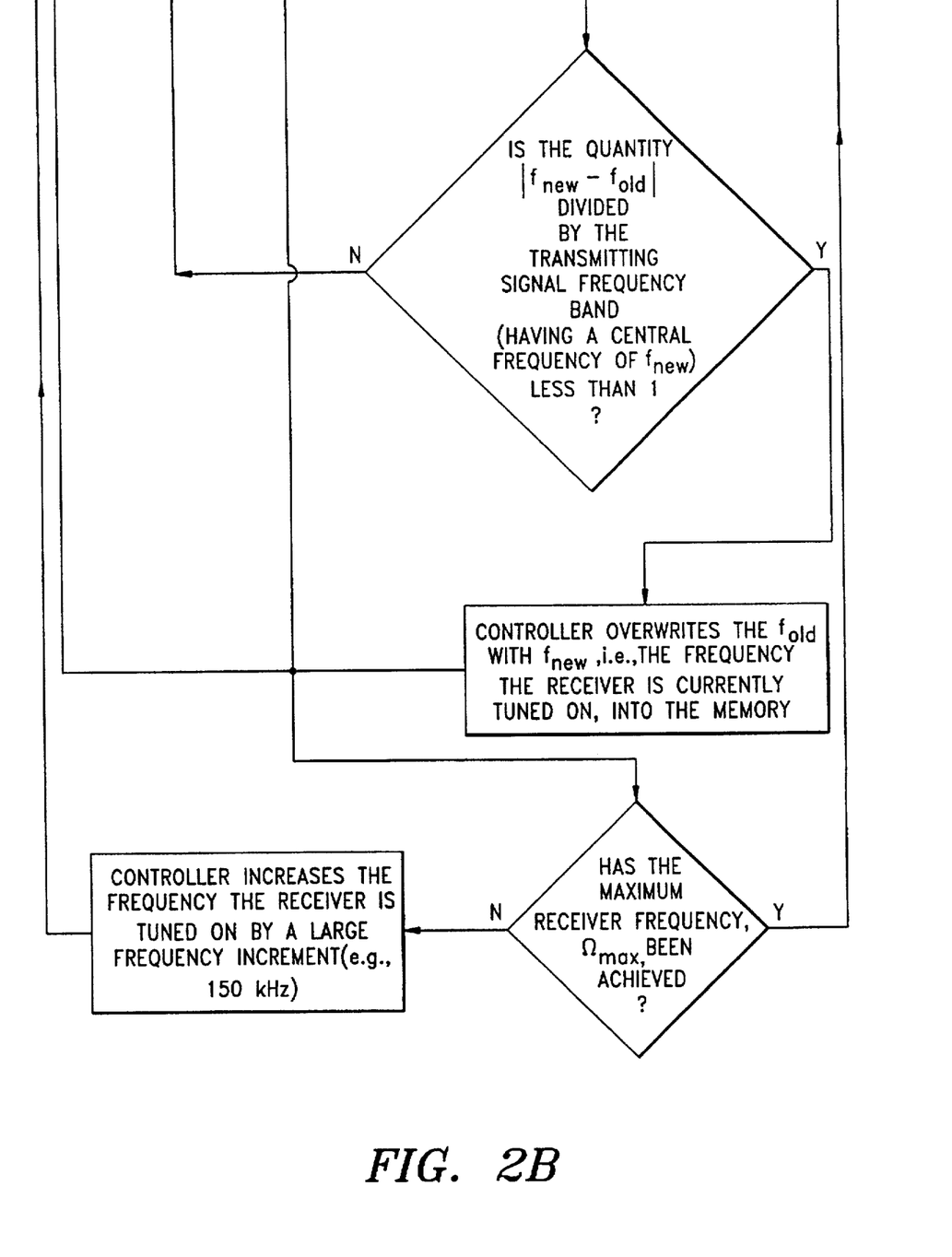
Figure 3A:
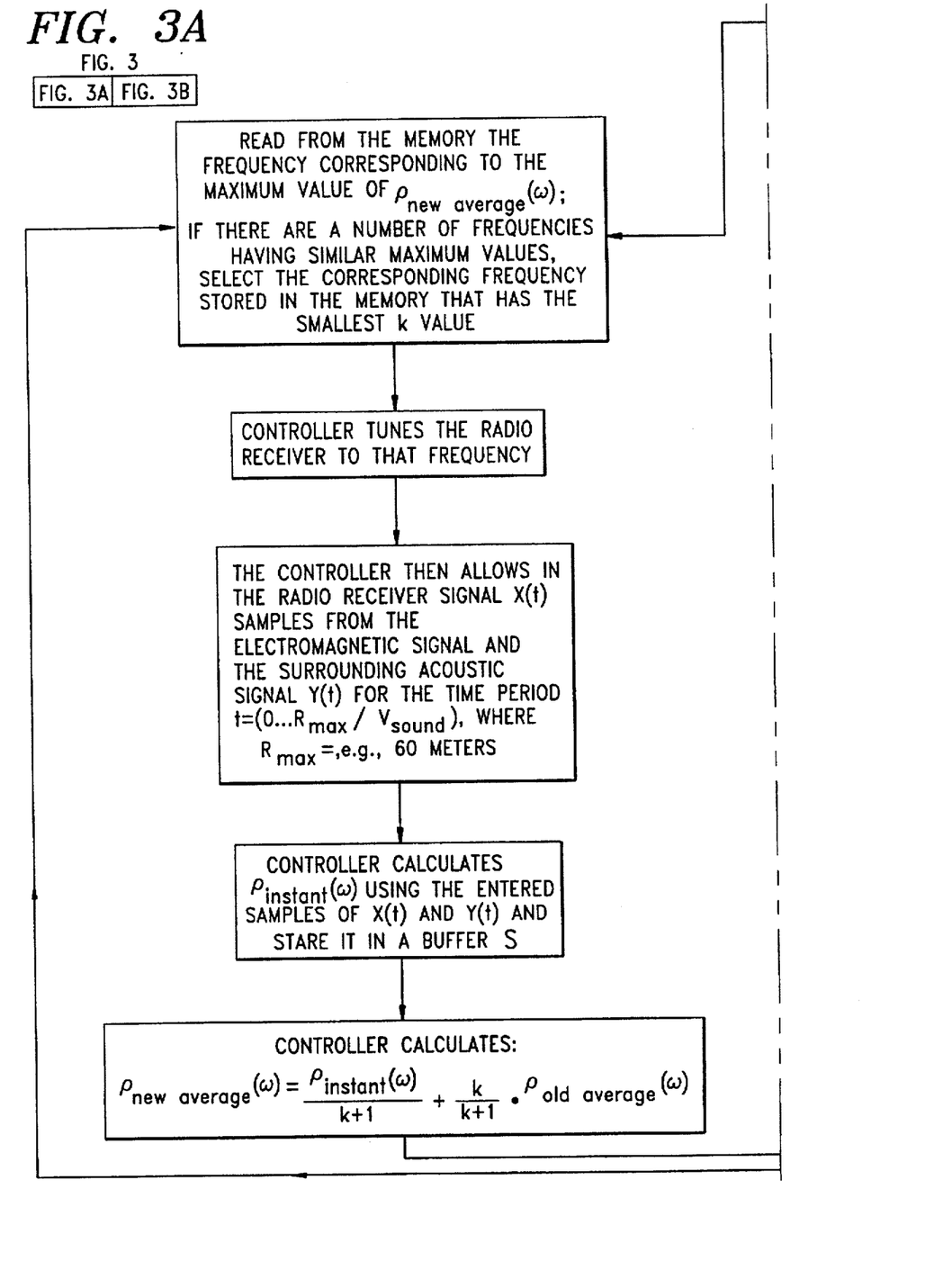
FIGS. 3A–3B comprise a flow chart of the detecting (second) process of the present invention.
Figure 3B:
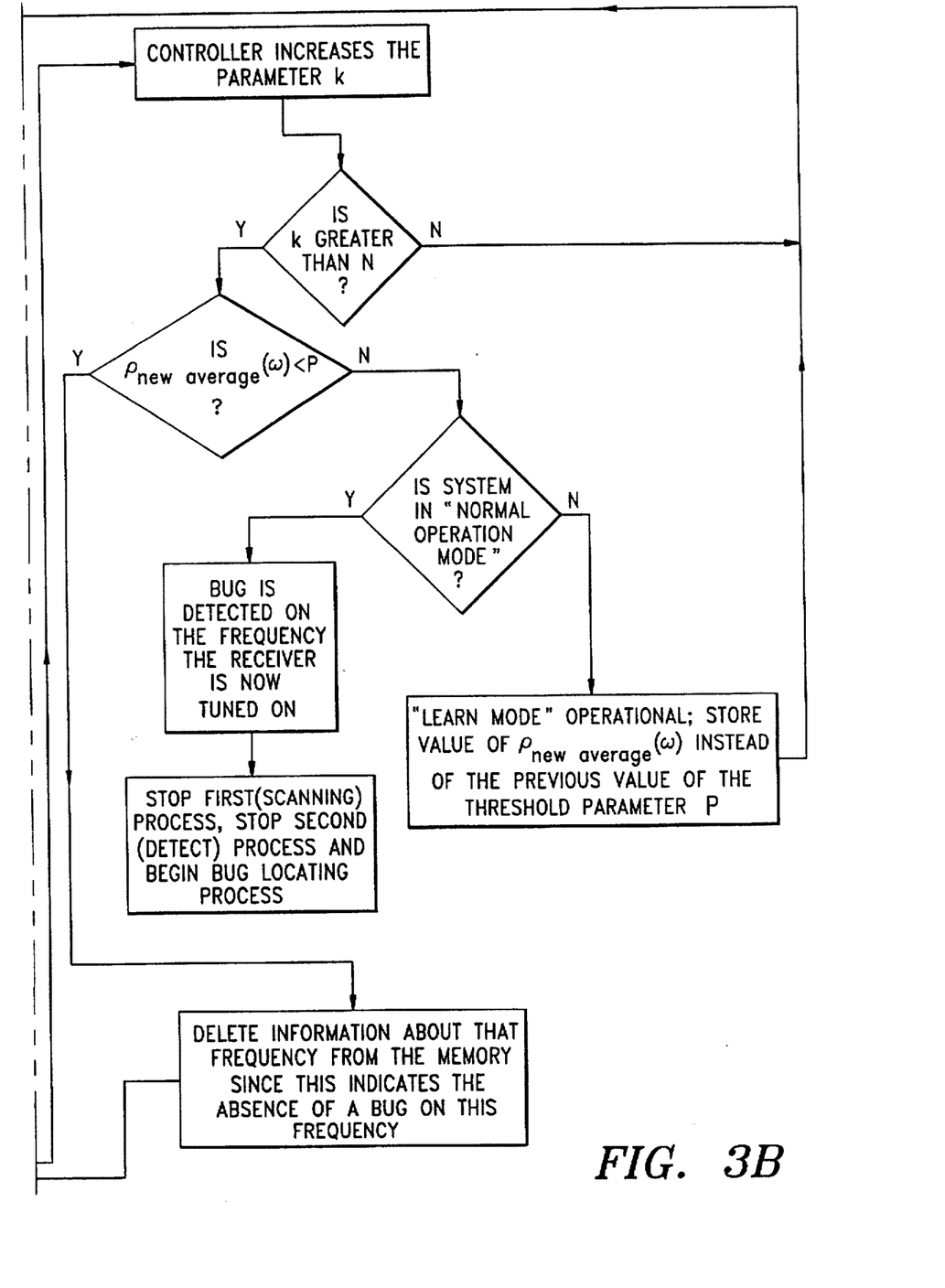

As shown in FIG. 2, the controller 26 checks to make sure that the received signal is above the receiver noise level (e.g., 1–2 μvolts) before performing the cross correlation calculation at the frequency under test. To verify that the receiver 22 has tuned to a new frequency, the controller 26 checks the quantity $|f_{new}-f_{old}|$/transmitting signal frequency band; if that quantity is less than one, the receiver 22 is still tuned to the old frequency; otherwise, the receiver 22 has tuned to a new frequency.

Once an array of average cross correlations for different frequencies has been stored in the controller 26, the controller 26 selects that frequency $(\Omega_{extr})$ which corresponds with the highest average cross correlation function $\rho_{new\ average}(\omega_{extr})$. This frequency $\omega_{extr}$ is the frequency on which the bug 10 is transmitting. If the array contains a plurality of average cross correlation that all have the same maximum value, the controller 26 selects that frequency $\omega_{extr}$ whose average cross correlation $\rho_{new\ average}(\omega_{extr})$ has the smallest k.

Once the apparatus 20 has detected the bug 10 and determined its transmitting frequency, the apparatus 20 locks on to that transmitting frequency in order to determine the location of the bug 10. To do this, the controller 26 activates each of the four acoustic transducers 24A–24D, one at a time. The four transducers 24A–24D are shown in a equilateral triangular pyramid orientation. However, it should be noted that particular orientation of the transducers is not required but only exemplary; the only requirement for correct bug location determination is that one of the four acoustic transducers not be disposed in the same plane as the other acoustic transducers.

Figure 4:
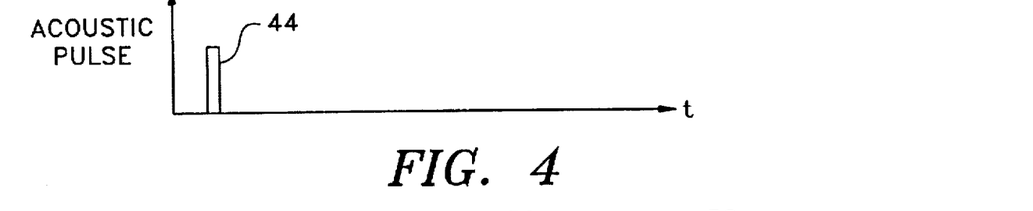
FIG. 4 is a time diagram of the pulse signal from the controller to an acoustic transducer.
Figure 5:
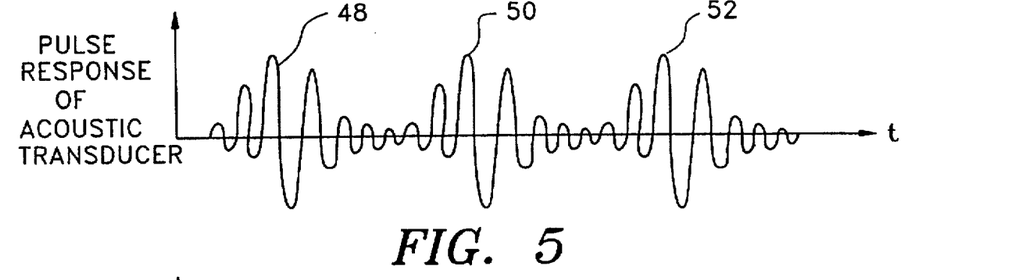
FIG. 5 is a time diagram of the acoustic signal received by the bug from the pulsed acoustic transducer.
Figure 8:
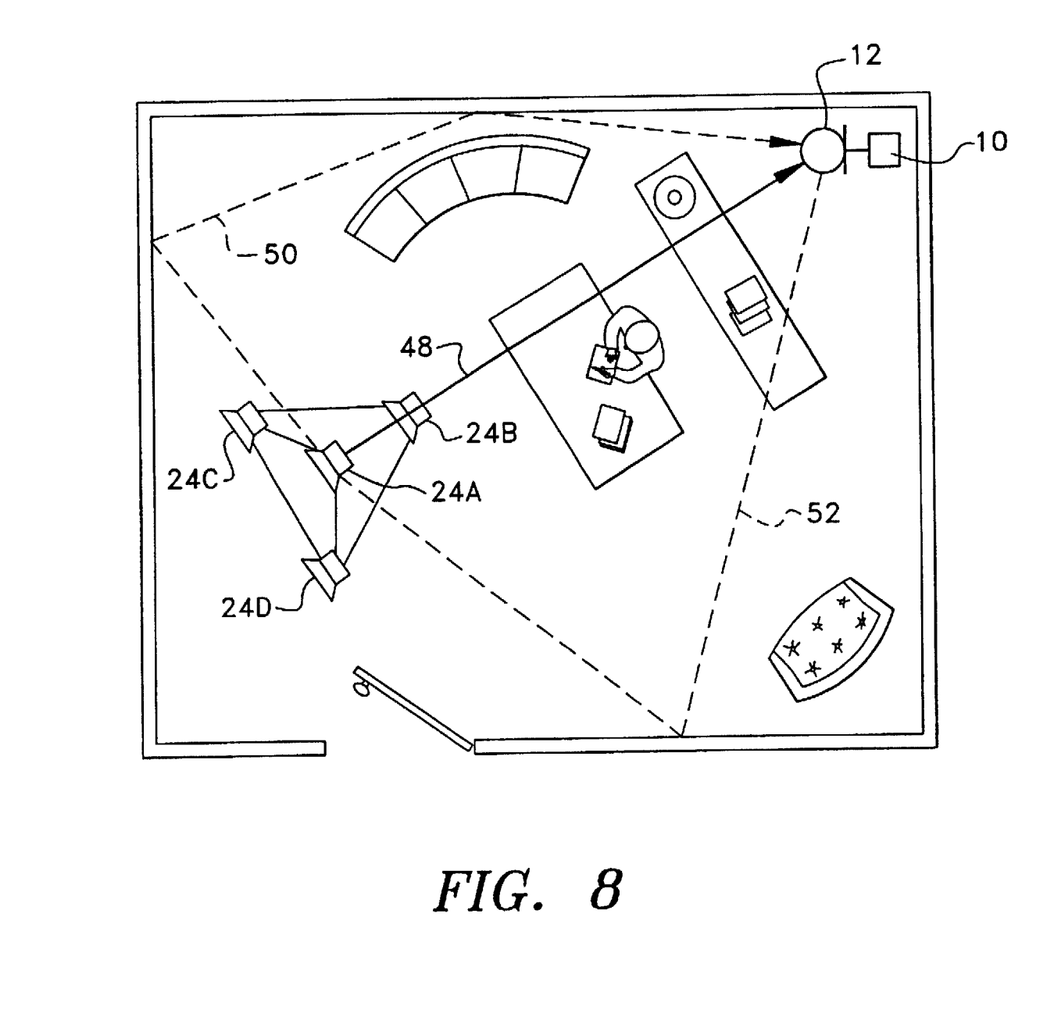
FIG. 8 is a top view of a room containing a concealed listening device.

The controller 26 sends a pulse 44 (FIG. 4) to one of the acoustic transducers 24A which emits an acoustic signal 46 (FIG. 1). This acoustic signal 46 propagates through the vicinity in different directions and is detected by the bug microphone 12. Since the acoustic signal 46 propagates in all directions, reflections of the acoustic signal 46 are also detected by the bug microphone 12. The acoustic signal 46 that is received first by the bug microphone 12 is the one that travels in a straight line 48 from the acoustic transducer 24A to the bug 10 (FIG. 8). The presence of walls, furniture, people, etc., all contribute to the different reflections of the acoustic signal 46; some of these reflection paths of the acoustic signal 46 are shown by 50 and 52. As a result, the overall signal received by the bug 10 due to the acoustic transducer 24A being pulsed is shown in FIG. 5. Note that the character of the received acoustic signal 46 signal is not the well-defined pulse sent by the controller 26; this is due to the pulse response of the acoustic transducer 24A and pulse response of the media (Room).

Figure 6:
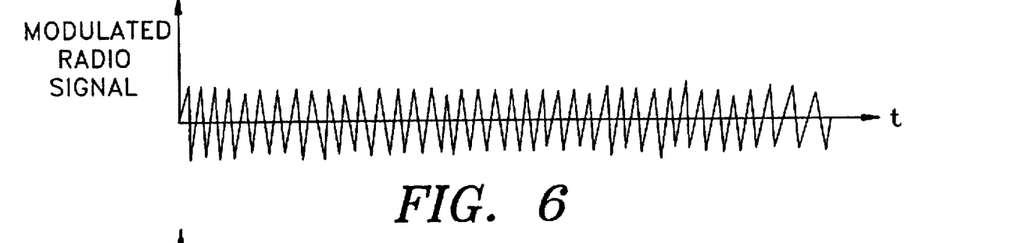
FIG. 6 is a time diagram of the modulated radio signal representative of the acoustic signal of FIG. 5 transmitted by the bug.

The bug 10, in turn, transmits its own version of the received acoustic signal 46 as a modulated radio signal (FIG. 6). The radio receiver 22, which is now tuned to the bug's 10 transmitting frequency, as discussed previously, detects the modulated radio signal and sends it to the A/D 34B for conversion into a digital signal. The controller 26 can then determine the time of acoustic signal 46 travel from, among other equations, $T_{inp}=R_{max}/V_{sound}$.

It should be noted that since the speed of the modulation radio signal is extremely greater than the speed of sound, it is reasonable to assume, for calculation purposes, that the radio receiver 22 receives the modulated radio signal instantaneously from the bug 10.

Figure 13:
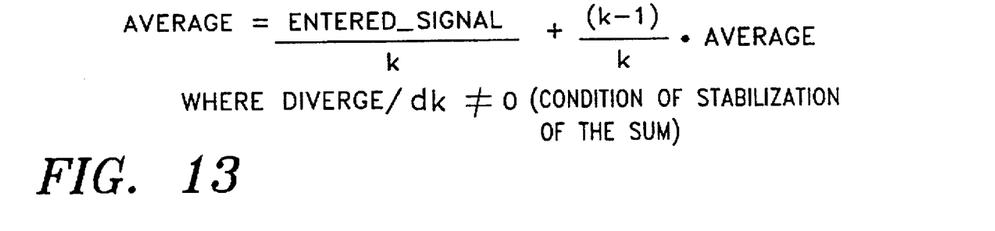
FIG. 13 is the average response function for the pulsed acoustic transducer.

The controller 26 then calculates an average of the response signals by repeating the pulsing process N more times, while adding the most current value to that average. The value of N must be large enough to stabilize the average response. The accumulation number k (k=1 . . . N) can be represented by the accumulation equation as shown in FIG. 13. N is the number of acoustic pulses, transmitted via the acoustic transducer at the relative time moments:

$$t=0,\ R_{max}/V_{sound},\ 2\cdot R_{max}/V_{sound}, \ldots, k\cdot R_{max}/V_{sound}, \ldots (N-1)\cdot R_{max}/V_{sound}$$

Figure 14:
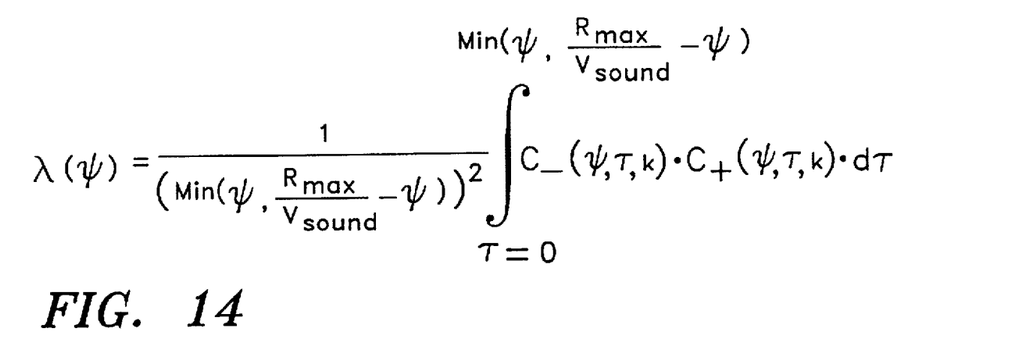
FIG. 14 is the distinguishing function.
Figure 15:
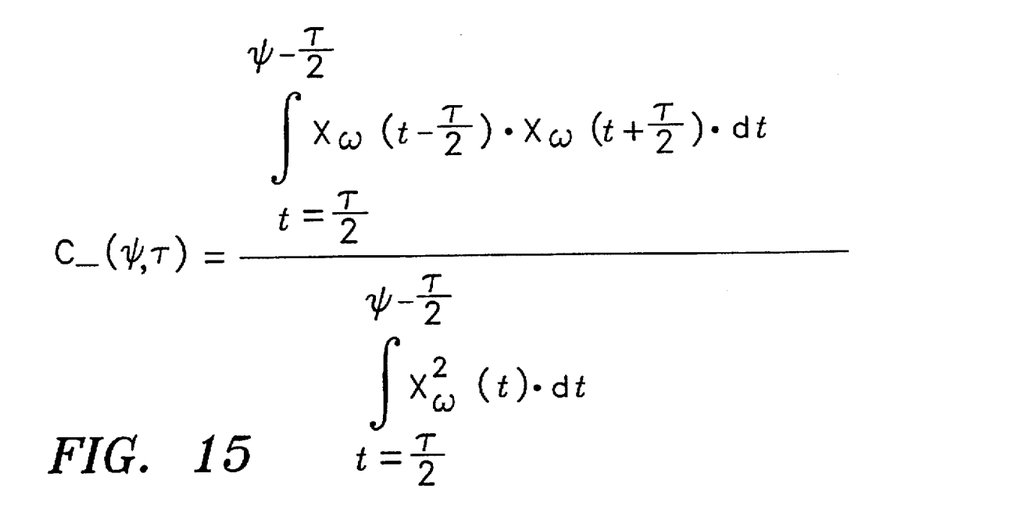
FIG. 15 is the auto correlation of the "before" part of the accumulated input signal of the pulsed acoustic transducer.
Figure 16:
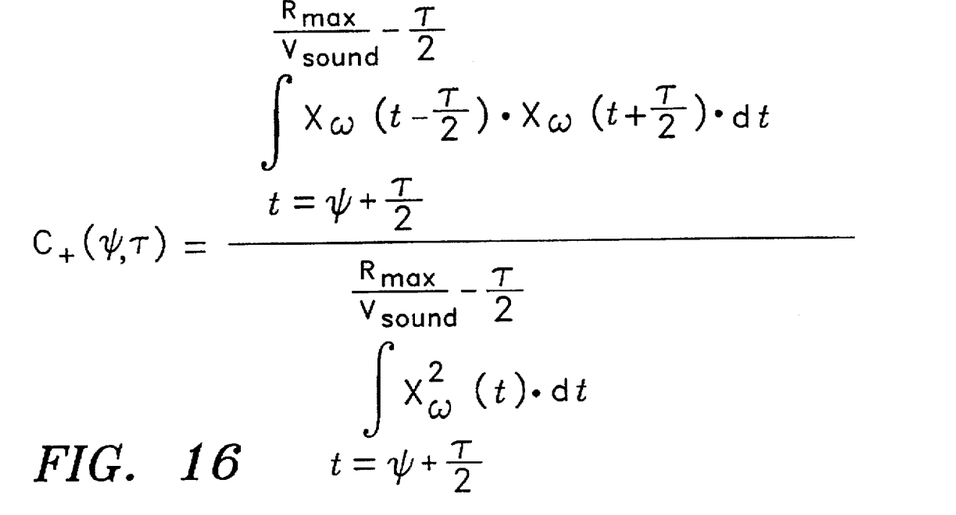
FIG. 16 is the auto correlation of the "after" part of the accumulated input signal of the pulsed acoustic transducer.

After the average response signal is calculated, the controller 26 calculates the range, R, based on the speed of sound in air, $V_{sound}$, and the time it took for the pulse signal to be received by bug 10 (i.e., by the radio receiver 22 since it is assumed that receipt is instantaneous as discussed above). However, as can be seen from FIG. 6, is very difficult to accurately determine the beginning of the acoustic signal 46 from the received modulated radio signal. To find the beginning of the received acoustic signal 46, the controller 26 utilizes a distinguishing function, $\lambda(\psi)$, to derive the time of arrival, $\psi_{extr}$, of the received acoustic signal 46. The distinguishing function $\lambda(\psi)$ is set forth in FIG. 14 and is a correlation function based on the auto correlation of $c_-(\psi,\tau)$ and $c_+(\psi,\tau)$ (set forth in FIGS. 15 and 16, respectively), of the accumulated input signal "before" and "after" a divider, $\psi$, where $0<\psi<(R_{max}/V_{sound})$.

Figure 7:
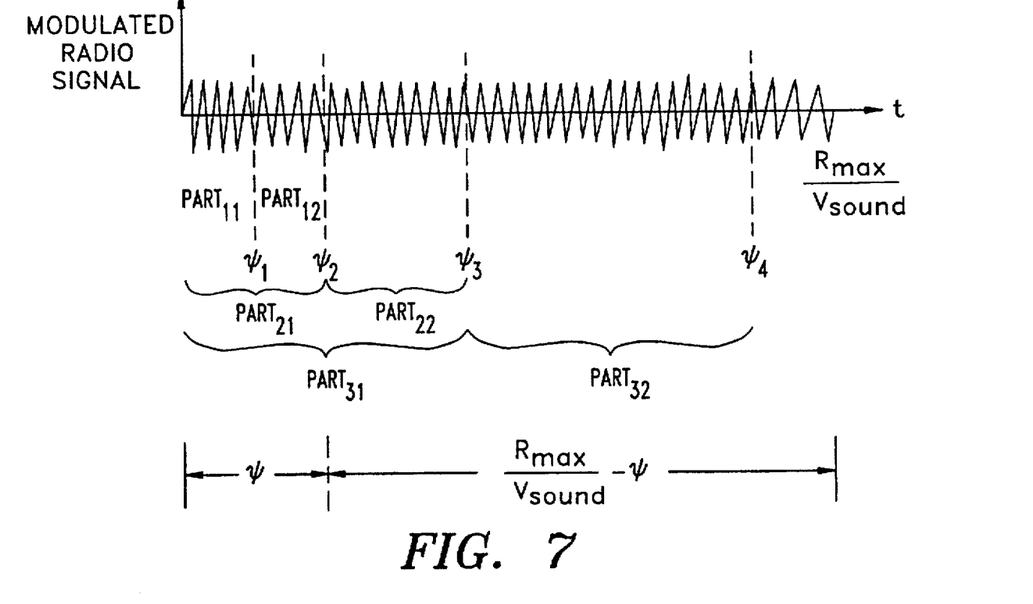
FIG. 7 is a time diagram of the modulated radio signal of FIG. 6 showing how the controller implements a distinguishing function to determine the time of arrival of the pulse at the bug.

At a particular $\psi$, namely, $\psi_{extr}$ the coefficient of the $\lambda(\psi)$ function is a minimum. This minimum of the coefficient represents the beginning of the received acoustic signal 46. As shown in FIG. 7, the controller 26 initially partitions the accumulated signal into $\psi_1$ and $R_{max}/V_{sound}-\psi_1$, thereby defining the "before" part (Part$_{11}$) and the "after" part (Part$_{12}$) having respective auto correlations of $c_{-1}(\psi,\tau)$ and $c_{+1}(\psi,\tau)$. The distinguishing function $\lambda(\psi)$ is then performed using these parts. Next, the controller 26 defines a second divider, $\psi_2$ whose individual parts (Part$_{21}$ and Part$_{22}$) have the same size as the sum of the parts of the $\psi_1$, as shown in FIG. 7. This process is repeated and once it is completed, there exists a $\psi_{extr}$ such that the distinguishing function $\lambda(\psi)$ is a minimum. The controller 26 then selects that $\psi_{extr}$ and then uses the following equation, $$R = V_{sound} \psi_{extr}$$

to calculate the range $R_1$ for the acoustic transducer 24A.

The controller 26 then repeats the above process for each of the acoustic transducers 24B–24D.

Figure 17:
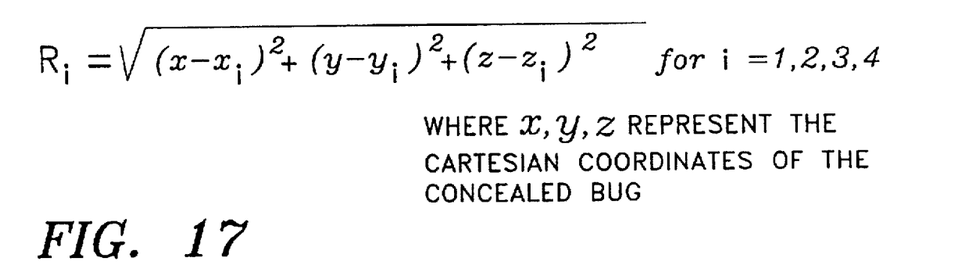
FIG. 17 is the general equation for determining the range of the concealed listening device.
Figure 18:
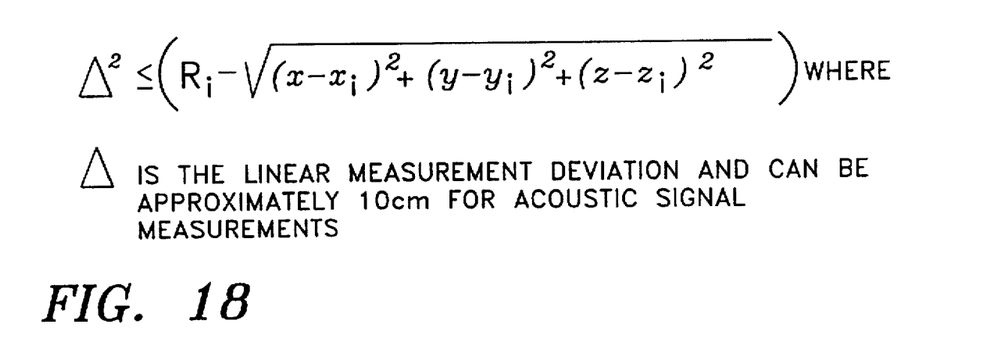
FIG. 18 is the correction equation for use with the equation of FIG. 17.

After all four acoustic transducers have determined their corresponding range value (i.e., the distance between the bug 10 and the individual acoustic transducer 24A–24D), the controller 26 can then determine the coordinates of the bug 10 based on the knowledge of the coordinates of each of the transducers 24A–24D and the determined range values, $R_1$–$R_4$. In general, the controller 26 performs the equation as shown in FIG. 17. In particular, because errors are introduced in the measurement of the different ranges, the actual location of the bug 10 is defined by equation in FIG. 18.

Figure 19:
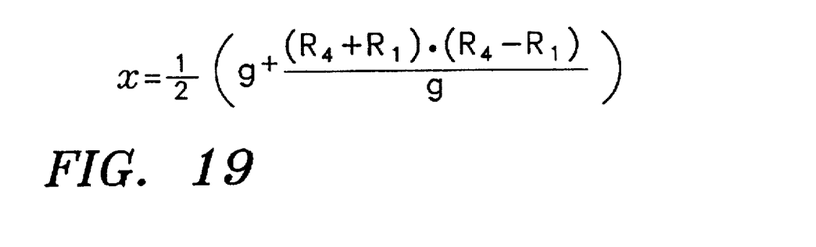
FIGS. 19–21 are the equations used for determining the location of the concealed listening device if the acoustic transducers are positioned at the exemplary respective positions of (g,0,0), (0,g,0), (0,0,g) and (0,0,0)
Figure 20:
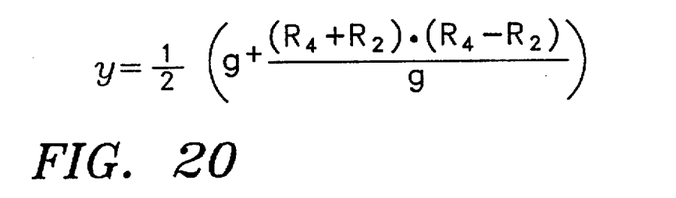
Figure 21:
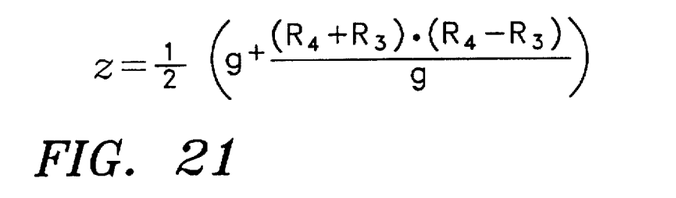
Figure 22:
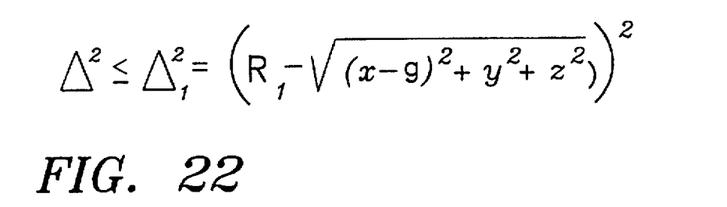
FIGS. 22–25 are the deviation equations to be used with those of FIGS. 19–21.
Figure 23:
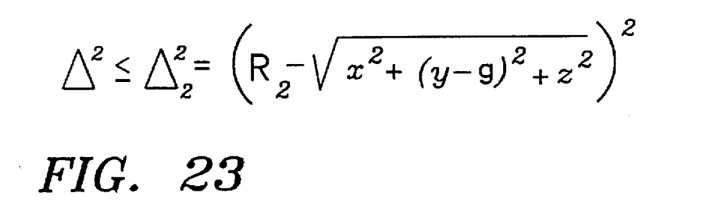
Figure 24:
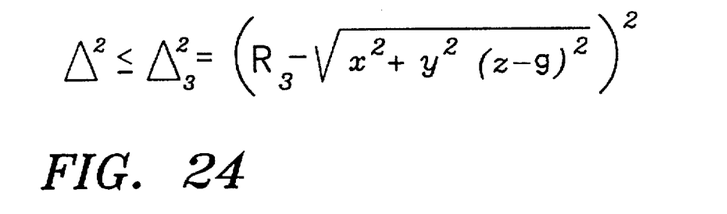
Figure 25:
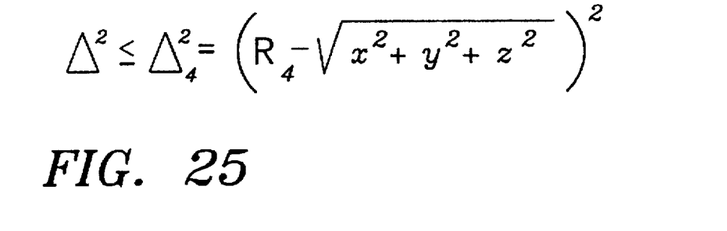
Figure 26:
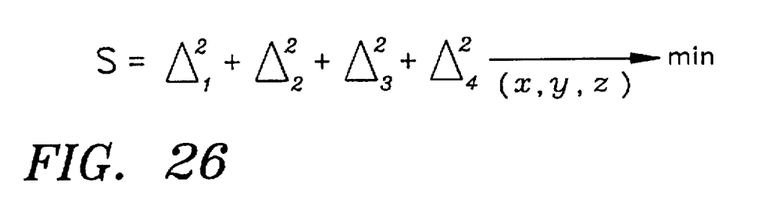
FIGS. 26–27 are equations to be used with an optimization method for determining the minimum coordinate deviation for correcting the x, y and z components of the concealed listening device location.
Figure 27:
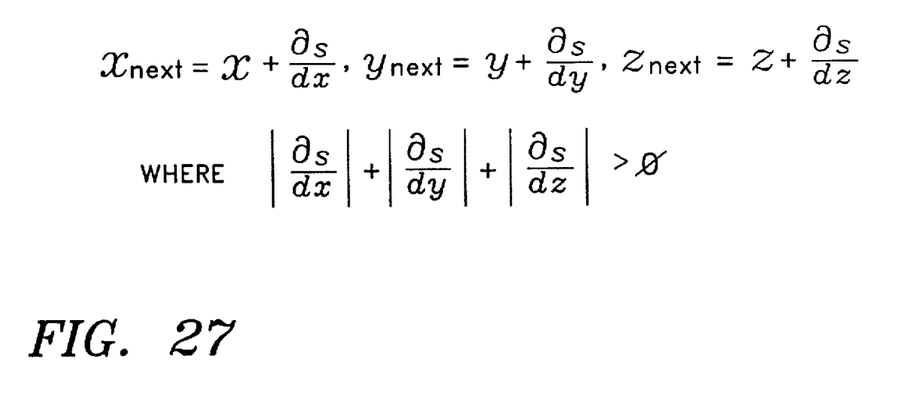

For example, if the acoustic transducers 24A–24D are located at (g,0,0), (0,g,0), (0,0,g) and (0,0,0), respectively, and the controller 26 has determined the respective ranges $R_1$–$R_4$, the actual location of the bug 10 can be determined by the equations shown in FIGS. 19–21 in combination with deviation equations shown in FIGS. 22–25. It is then necessary to use an optimization method (e.g., Newton optimization) to determine the minimum coordinate deviation using the equations shown in FIGS. 26 and 27 to serially correct the x, y and z components.

Without further elaboration, the foregoing will so fully illustrate my invention that others may, by applying current or future knowledge, readily adopt the same for use under various conditions of service.

I claim:

1. An apparatus for detecting the presence or absence of a concealed listening device wherein the concealed listening device receives an acoustic signal and then wirelessly transmits an electromagnetic version of that acoustic signal over the air to a remote receiver, said apparatus comprising:
   a radio receiver for measuring the signal strength of a first electrical signal in the radio frequency band to which said radio receiver is tuned;
   a microphone for detecting and converting the acoustic signal into a second electrical signal; and
   a controller, coupled to said radio receiver and said microphone, for tuning the radio receiver within the radio frequency band, said controller comprising means for determining the cross correlation between an auto correlation of said first electrical signal and an auto correlation of said second electrical signal to determine the presence of the concealed listening device.

2. The apparatus of claim 1 wherein said determining means determines an average cross correlation value from a plurality of cross correlation values.

3. The apparatus of claim 2 wherein said determining means determines a threshold cross correlation value when said apparatus is initially powered up and is disposed in a room which contains no concealed listening device.

4. The apparatus of claim 3 wherein said determining means determines that a concealed listening device is present whenever said average cross correlation function exceeds said threshold cross correlation value.

5. The apparatus of claim 4 wherein said determining means determines the frequency of said electromagnetic version of the acoustic signal based on the maximum average correlation function value.

6. The apparatus of claim 1 wherein said apparatus further comprises an acoustic transducer arrangement coupled to said controller to be activated by said controller in determining the position of the concealed listening device.

7. The apparatus of claim 6 wherein said controller comprises means for pulsing the acoustic transducer arrangement.

8. The apparatus of claim 7 wherein said controller comprises means for detecting the beginning of a received pulse response by the use of a cross correlation function between a first part of the received pulse response and a second part of the received pulse response.

9. The apparatus of claim 8 wherein said acoustic transducer arrangement comprises four acoustic transducers such that one of said transducers is not coplanar with the others of said transducers.

10. The apparatus of claim 9 wherein said controller further comprises range determining means for determining the range between each of said acoustic transducers and the concealed listening device.

11. The apparatus of claim 10 wherein said means for determining the range further comprises means for determining the location of the concealed listening device based on said range between each of said acoustic transducers.

12. A method for detecting the presence or absence of a concealed listening device wherein the concealed listening device receives an acoustic signal and then wirelessly transmits an electromagnetic version of that acoustic signal over the air to a remote receiver, said method comprising the steps of:
   (a) measuring the signal strength of a first electrical signal in the radio frequency band to which said radio receiver is tuned;
   (b) detecting and converting the acoustic signal into a second electrical signal; and
   (c) determining the cross correlation between an auto correlation of said first electrical signal and an auto correlation of said second electrical signal to determine the presence of the concealed listening device.

13. The method of claim 12 which further comprises the step of tuning the radio receiver to another frequency in the radio frequency band and repeating steps a–c to generate a plurality of cross correlations.

14. The method of claim 13 which further comprises the step of determining an average cross correlation from said plurality of cross correlations and then comparing said average cross correlation to a threshold average cross correlation value for determining if a concealed listening device is present.

15. The method of claim 14 which further comprises the step of selecting the maximum average cross correlation to identify the frequency that the concealed listening device is wirelessly transmitting the electromagnetic version of the acoustic signal and then maintaining said radio receiver on the frequency.

16. The method of claim 12 wherein the step of measuring the signal strength of said first electrical signal comprises the steps of:
   (a) scanning a first sub-band of frequencies in the radio frequency band;
   (b) measuring the signal strength of each of said frequencies in said sub-band;
   (c) selecting that frequency in the sub-band that exhibits the maximum signal strength thereby defining said first electrical signal.

17. The method of claim 15 which further comprises the step of pulsing a first acoustic transducer, having a known location, to form a pulsed acoustic signal and detecting an electromagnetic version of said pulsed acoustic signal from said concealed listening device, said pulsing of said first acoustic transducer and said detecting of said electromagnetic version of said pulsed acoustic signal being repeated N times to generate an average response signal.

18. The method of claim 17 which further comprises the steps of:
   (a) partitioning said average response signal into a first pair of two parts of equal size and determining a first correlation function between the auto correlation function of each of these two parts, said first correlation function having a first coefficient; and
   (b) re-partitioning said average response signal into a second pair of two parts of equal size, wherein each part of said second pair is equal to the sum of said sizes of said first pair of two parts, and determining a second correlation function between the auto correlation function of each of said parts of said second pair, said second correlation function having a second coefficient.

19. The method of claim 18 which further comprises repeating steps (a) and (b).

20. The method of claim 19 which further comprises the step of selecting the time value that corresponds to the correlation function having the minimum coefficient.

21. The method of claim 20 which further comprises the step of calculating the range from said pulsed acoustic transducer by multiplying said selected time value with the speed of sound.

22. The method of claim 21 which further comprises the step of pulsing a second acoustic transducer, having a known location distinct from said first acoustic transducer, to form a second pulsed acoustic signal and detecting an electromagnetic version of said second pulsed acoustic signal from said concealed listening device, said pulsing of said second acoustic transducer and said detecting of said second electromagnetic version of said pulsed acoustic signal being repeated N times to generate an average response signal.

23. The method of claim 22 which further comprises the steps of:
   (a) partitioning said second average response signal into a first pair of two parts of equal size and determining a first correlation function between the auto correlation function of each of these two parts, said first correlation function having a first coefficient; and
   (b) re-partitioning said second average response signal into a second pair of two parts of equal size, wherein each part of said second pair is equal to the sum of said sizes of said first pair of two parts, and determining a second correlation function between the auto correlation function of each of said parts of said second pair, said second correlation function having a second coefficient.

24. The method of claim 23 which further comprises repeating steps (a) and (b).

25. The method of claim 24 which further comprises the step of selecting the time value that corresponds to the correlation function having the minimum coefficient.

26. The method of claim 25 which further comprises the step of calculating the range from said second pulsed acoustic transducer by multiplying said selected time value with the speed of sound.

27. The method of claim 26 which further comprises the step of pulsing a third acoustic transducer, having a known location distinct from said first and second acoustic transducers, to form a third pulsed acoustic signal and detecting an electromagnetic version of said third pulsed acoustic signal from said concealed listening device, said pulsing of said third acoustic transducer and said detecting of said third electromagnetic version of said pulsed acoustic signal being repeated N times to generate a third average response signal.

28. The method of claim 27 which further comprises the steps of:
   (a) partitioning said second average response signal into a first pair of two parts of equal size and determining a first correlation function between the auto correlation function of each of these two parts, said first correlation function having a first coefficient; and
   (b) re-partitioning said second average response signal into a second pair of two parts of equal size, wherein each part of said second pair is equal to the sum of said sizes of said first pair of two parts, and determining a second correlation function between the auto correlation function of each of said parts of said second pair, said second correlation function having a second coefficient.

29. The method of claim 28 which further comprises repeating steps (a) and (b).

30. The method of claim 29 which further comprises the step of selecting the time value that corresponds to the correlation function having the minimum coefficient.

31. The method of claim 30 which further comprises the step of calculating the range from said third pulsed acoustic transducer by multiplying said selected time value with the speed of sound.

32. The method of claim 31 which further comprises the step of pulsing a fourth acoustic transducer, having a known location that is outside a plane formed by said first, second and third acoustic transducers, to form a fourth pulsed acoustic signal and detecting an electromagnetic version of said fourth pulsed acoustic signal from said concealed listening device, said pulsing of said fourth acoustic transducer and said detecting of said fourth electromagnetic version of said pulsed acoustic signal being repeated N times to generate a fourth average response signal.

33. The method of claim 32 which further comprises the steps of:
   (a) partitioning said fourth average response signal into a first pair of two parts of equal size and determining a first correlation function between the auto correlation function of each of these two parts, said first correlation function having a first coefficient; and
   (b) re-partitioning said fourth average response signal into a second pair of two parts of equal size, wherein each part of said second pair is equal to the sum of said sizes of said first pair of two parts, and determining a second correlation function between the auto correlation function of each of said parts of said second pair, said second correlation function having a second coefficient.

34. The method of claim 33 which further comprises repeating steps (a) and (b).

35. The method of claim 34 which further comprises the step of selecting the time value that corresponds to the correlation function having the minimum coefficient.

36. The method of claim 35 which further comprises the step of calculating the range from said fourth pulsed acoustic transducer by multiplying said selected time value with the speed of sound.

* * * * *